(12) United States Patent
Huber et al.

(10) Patent No.: US 9,604,441 B2
(45) Date of Patent: Mar. 28, 2017

(54) LAMINATING BODY

(75) Inventors: Peter Huber, Fürstenfeldbruck (DE); Andreas Minks, Weyarn (DE); Klaus Kohl, Miesbach (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 0 days.

(21) Appl. No.: 13/509,892

(22) PCT Filed: Nov. 16, 2010

(86) PCT No.: PCT/EP2010/006973
§ 371 (c)(1),
(2), (4) Date: May 15, 2012

(87) PCT Pub. No.: WO2011/057824
PCT Pub. Date: May 19, 2011

(65) Prior Publication Data
US 2012/0216947 A1   Aug. 30, 2012

(30) Foreign Application Priority Data
Nov. 16, 2009   (DE) .......................... 10 2009 053 498

(51) Int. Cl.
*B32B 37/10* (2006.01)
*B32B 38/06* (2006.01)
(Continued)

(52) U.S. Cl.
CPC .............. *B32B 38/06* (2013.01); *B30B 3/005* (2013.01); *B30B 15/062* (2013.01); *B32B 37/0046* (2013.01); *B32B 38/145* (2013.01); *B29C 33/38* (2013.01); *B29C 33/424* (2013.01); *B29C 59/02* (2013.01); *B29C 59/04* (2013.01);
(Continued)

(58) Field of Classification Search
CPC ..... B29C 33/38; B29C 33/424; B29C 33/428; B29C 59/022; B29C 59/026; B29C 33/3807; B29C 33/3828; B29C 33/3842; B29C 33/426; B32B 38/06; B32B 37/0046; B32B 2037/0061; B32B 38/145; B32B 37/0053; Y10T 156/1039; B30B 3/005; B30B 15/062
USPC ....... 156/196, 219, 220, 221, 222, 277, 580, 156/581, 209, 582; 264/220, 226, 293,
(Continued)

(56) References Cited

U.S. PATENT DOCUMENTS 1,947,916 A * 2/1934 Mitchell ...................... 76/107.1
3,859,110 A * 1/1975 Foster et al. .................. 264/220
(Continued)

FOREIGN PATENT DOCUMENTS

DE          19647153 A1    5/1998
DE       102007013284 A1    9/2008
(Continued)

OTHER PUBLICATIONS

JP09-202979 Machine Translation; Yamamoto; Aug. 5, 1997.*
(Continued)

*Primary Examiner* — Philip Tucker
*Assistant Examiner* — John Blades
(74) *Attorney, Agent, or Firm* — Workman Nydegger

(57) ABSTRACT

A laminating body for laminating a foil onto a substrate includes a pressure area on which there is imprinted a structure which forms an embossing in the foil upon lamination of the foil onto the substrate.

20 Claims, 4 Drawing Sheets

(51) Int. Cl.
  *B30B 3/00* (2006.01)
  *B30B 15/06* (2006.01)
  *B32B 37/00* (2006.01)
  *B32B 38/00* (2006.01)
  *B29C 33/38* (2006.01)
  *B29C 33/42* (2006.01)
  *B29C 59/02* (2006.01)
  *B29C 59/04* (2006.01)

(52) U.S. Cl.
  CPC ....... *B32B 2311/00* (2013.01); *B32B 2425/00* (2013.01); *Y10T 156/1039* (2015.01)

(58) Field of Classification Search
  USPC ........ 264/219, 222, 224, 225, 227; 425/385; 101/3.1, 16, 28, 29, 32
  See application file for complete search history.

(56) References Cited

U.S. PATENT DOCUMENTS 4,211,743 A * 7/1980 Nauta et al. ................... 264/284
4,396,448 A * 8/1983 Ohta et al. .................... 156/219
4,431,774 A * 2/1984 Felder-Schraner et al. .... 522/15
2007/0272150 A1 * 11/2007 Swoboda et al. ............. 118/642
2008/0011167 A1   1/2008 Prager et al.
2008/0264559 A1  10/2008 Akhtar et al.
2009/0237795 A1 * 9/2009 Koivukunnas et al. ...... 359/566

FOREIGN PATENT DOCUMENTS

| DE | 102008008044 A1 | 8/2009 | |
|---|---|---|---|
| JP | 0872140 A | 3/1996 | |
| JP | 09-202979 | * 8/1997 | ................ C23F 1/00 |

OTHER PUBLICATIONS http://fantes.com/copper-lacquer-removal.html; Feb. 13, 2008.*
http://www.nature.com /nature/journal/v205/n4975/abs/2051005a0.html; Cottam; Mar. 6, 1965.*
IPEX PP Chemical Resistance Guide; 2009.*
International Search Report for PCT/EP2010/006973, Feb. 25, 2011.
International Preliminary Report on Patentability for PCT/EP2010/006973, Jun. 12, 2012.
"Varnish", Internet Archive WayBackMachine, Wikipedia, http://en.wikipedia.org/wiki/Varnish, Mar. 26, 2009, 4 pages, Retrieved from the Internet on Jul. 10, 2014.

* cited by examiner

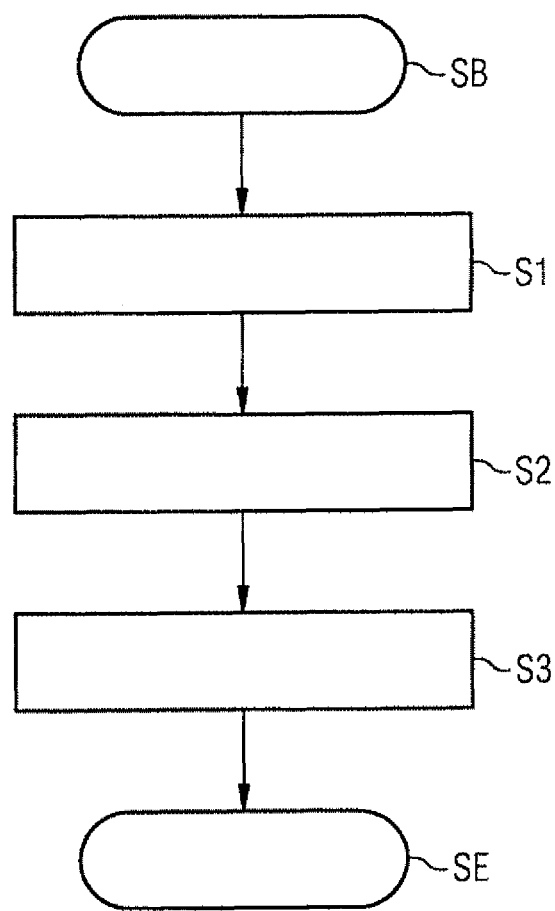

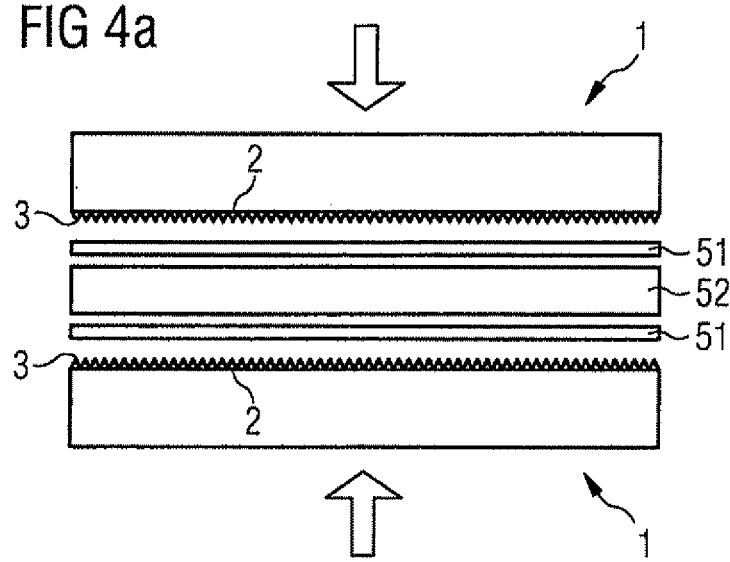
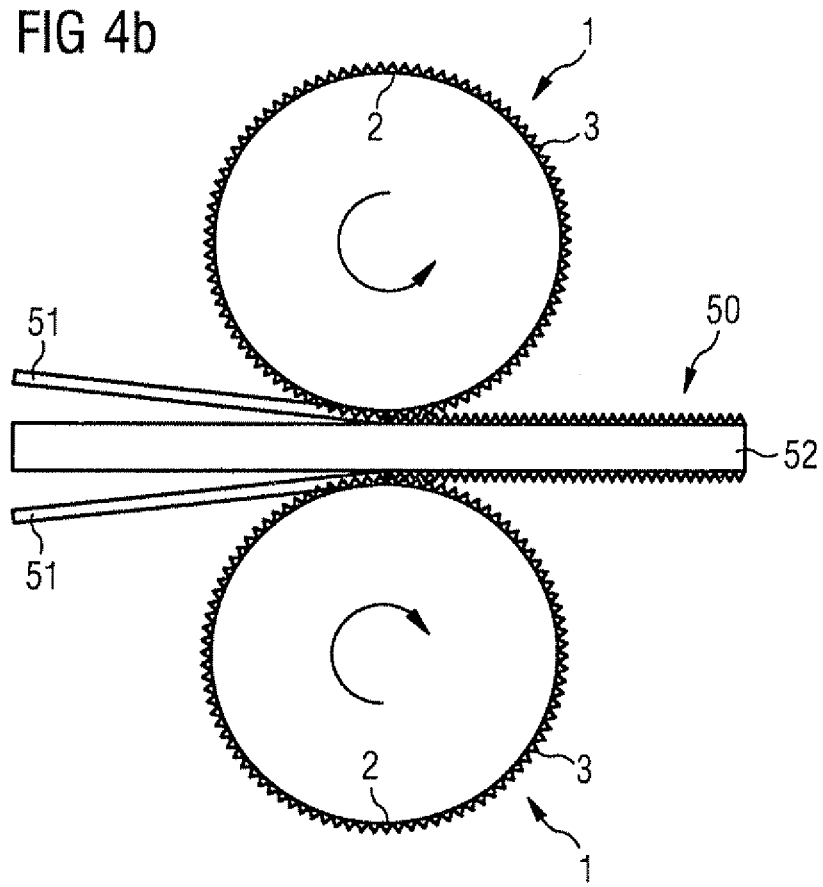

LAMINATING BODY

BACKGROUND OF THE INVENTION

A. Field of the Invention

This invention relates to a laminating body for manufacturing laminate products by laminating a foil onto a substrate, and to a method for manufacturing such a laminating body and a method for manufacturing a laminate product by means of the laminating body.

B. Related Art

Relevant laminate products in the present case are primarily value documents, identity and identification documents, chip cards or other card-shaped data carriers and value carriers or the like. The substrate can consist here of an almost arbitrary suitable material, e.g. of paper, plastic or the like.

It is known to provide a pressure area of laminating bodies employed upon lamination with a structure in the form of depressions by milling, etching or engraving, said structure being embossed into the laminated-on foil upon lamination and being perceptible in the resulting laminate product. Such embossings can serve e.g. as security features of the relevant value documents or data carrier and, as such, represent identifying information, hard-to-forge embossed patterns or the like.

The manufacturing of structured laminating bodies according to the specifications of a laminate product manufacturer by milling, etching or engraving requires elaborate production equipment and production steps, which must normally be carried out by a manufacturer of the laminating body within the framework of the production process. This not only causes high costs, but also results in relatively long production times and delivery times, which leads to a lack of flexibility and low reaction times for the laminate product manufacturer, in particular in the case of laminate products to be manufactured urgently. This method is likewise disadvantageous when only small batches of laminate products are to be manufactured, because this requires a frequent change of the laminating body solely due to changed embossed structures.

Therefore, it is the object of the present invention to optimize the structuring of a laminating body so as to avoid the disadvantages of the prior art.

SUMMARY OF THE INVENTION

According to the invention, a pressure area of the laminating body has an imprinted structure which is configured such that the structure incorporates into the foil upon lamination an embossing corresponding in mirror-image form to the structure. Accordingly, this structure, upon the manufacture of the laminating body, is imprinted on the pressure area thereof such that the structure, upon lamination of a foil onto a substrate, is embossed into the foil in mirror-image form.

The imprinted structure is, in so doing, applied sufficiently raised or thick that it is embossed into the foil upon lamination. Moreover, the structure is adequately hard and mechanically resistant. Also, the structure is imprinted on the pressure area such that upon lamination the structure does not adhere to the foil to be laminated on, but can be detached therefrom without damage and without residue. Further, the structure is sufficiently heat-resistant so as not to be damaged by a heating of the pressure area that might be required for lamination.

Imprinting the structure on the pressure area of the laminating body in accordance with the invention requires substantially less technical effort than, for example, milling or etching. Accordingly, the imprinting is substantially simpler and faster to realize, more flexible and more cost-efficient. The laminating body of the invention can also be printed with the structure outside elaborate production facilities and without high technical effort, e.g. by a laminate manufacturer, such as e.g. a manufacturer of value documents and identity documents, card-shaped data carriers or the like.

This leads, on the one hand, to a considerable saving of time and costs and thus to an elevated flexibility, which is of great importance in the case of individual requirements for laminate products to be produced, e.g. in the case of small batch sizes or urgent tenders for value documents or card-shaped data carriers. Finally, by imprinting the structures on site it can also be ensured that a laminating body manufacturer obtains no confidential information in connection with the embossed structures and their contents.

The laminating body may be in particular a laminating plate. Preferably, the laminating body consists of chromium steel which is preferably high-gloss on one or both sides, or of brass which is preferably nickel-plated or chromium-plated and particularly preferably is high-gloss on one or both sides.

The imprinted structure can represent in particular individualization data or personalization data of users of the laminate products to be manufactured, e.g. name and identity particulars in the case of national identity cards or other identity cards.

Besides this, in principle arbitrary information and embossed patterns and embossed structures can be embossed with the imprinted structure into the foils to be laminated on. Preferably, the structure forms in the foil upon lamination one or several of the following embossings:

- images, such as e.g. country contours, logos, guilloche patterns or the like;
- alphanumeric characters, e.g. in the form of especially small microcharacters or as braille;
- aids for technical processing of the laminate product, in particular markings, insertion fields, height compensation fields and strip fields;
- areas with defined roughness, in particular for representing the above-mentioned images and markings;
- Multiple Laser Images (MLI), i.e. areas with several small lenses which produce an optical effect dependent on the viewing direction.

Height compensation fields refer in this connection to those regions of the imprinted structure that can compensate fluctuations in thickness of the laminate product, e.g. due to an object inserted therein, e.g. an electronic component, in particular a display, a fabric band or the like. On the other hand, height compensation fields can also produce fluctuations in thickness of the laminate product which in turn compensate corresponding fluctuations in thickness of a further product into which the laminate product is incorporated (e.g. a passport, in particular a passport with a fabric band).

Imprinted areal structures with defined roughness can be in particular areas that are matt or smooth over the full area or partly. Preferably, there are provided in the imprinted structure matt areas with "negative" images in which the actual image is represented as smooth areas within the matt area.

The imprinted structure is preferably configured such that it forms a tactilely perceptible embossing in the foil upon lamination.

The structure is preferably imprinted on the pressure area by means of screen printing and/or offset printing and/or UV offset printing. Offset printing and UV offset printing are particularly suited for producing extremely fine microstructures, such as e.g. microcharacters, and height compensation fields. Particularly preferably, a standard screen printing process is employed.

For printing the structure on the pressure area there is particularly preferably employed a thermally stable lacquer, in particular a stoving lacquer, a UV lacquer or a tactile UV lacquer. Through the employment of a thermally stable lacquer, a long life of the imprinted structure is guaranteed when the foil is heated for lamination.

In a preferred embodiment, the structure is imprinted on the pressure area with a removable lacquer. In particular, the removable lacquer may be a lacquer that can be removed again with a special cleaner. After removal of the imprinted structure, another structure can be imprinted on the pressure area, i.e. the laminating body can be reused. This is particularly expedient when there is imprinted a structure with individual information which is to be embossed upon lamination only a few times.

In addition to the imprinted structures on the pressure areas of the laminating body, there can be provided further structures which are etched, milled or engraved. This can be expedient for example when milled, etched or engraved structures produce a largely standardized basic embossing and the printed structures make individual additions to this basic embossing, e.g. in the form of user- or batch-specific particulars, such as e.g. names, denominations or the like.

DESCRIPTION OF THE DRAWINGS

Further features and advantages of the invention will result from the following description of embodiment examples of the invention as well as further alternative embodiments in connection with the drawings, which show:

FIG. 1 schematically the steps of a method for imprinting a structure on a laminating body;

FIGS. 4a, 4b schematically two different laminating apparatuses.

DETAILED DESCRIPTION OF PREFERRED EMBODIMENTS OF THE INVENTION

FIG. 1 shows schematically the steps of a method for imprinting a structure on a laminating body 1 and subsequent employment of the laminating body 1 for lamination.

After the beginning SB of the method, a laminating body 1 is first made available in step S1 and optionally so prepared that it can subsequently be printed in step S2. The laminating body 1 can consist in principle of any sufficiently heat-resistant and stable material. In the present case there is employed a laminating body 1 of metal, preferably of chromium steel or brass or nickel-plated brass or chromium-plated brass. Particularly preferably, the laminating body of metal is high-gloss on one or both sides.

For preparing the imprinting, the laminating body 1 is optionally cleaned or polished. Also, there can be applied to the pressure area 2 of the laminating body 1 an adhesion promoter or another chemical substance that facilitates or makes possible the printing of the laminating body 1 in step S2. Subsequently, in step S2 the laminating body 1 is printed with a suitable printing substance such that the pressure area 2 of the laminating body 1 has an imprinted structure 3 which is so configured that it forms an embossing in the foil 51 upon lamination (cf. step S3).

In order for the imprinted structure 3 to effect an embossing in the foil 51 upon lamination, it is sufficiently raised relative to the pressure area 2. Moreover, the imprinted structure 3 is adequately hard or mechanically resistant and does not adhere to the laminated-on foil 51 after lamination, i.e. an adhesive connection that the structure 3 might enter into with the foil 51 upon lamination is significantly weaker than the connection of the structure 3 to the pressure area 2. If the foil 51 is heated by the laminating body 1 or in another way for lamination, the structure 3 is moreover adequately heat-resistant.

The structure 3 can be imprinted on the pressure area 2 in any suitable fashion. Preferably there is used therefor a screen printing, offset printing or UV offset printing process, e.g. a standard screen printing process. For printing the structure 3 there is employed a thermally stable lacquer, e.g. a stoving lacquer, a UV lacquer or a tactile UV lacquer. There can also be employed a lacquer that can be removed again e.g. only with a special cleaner.

Figure 2A:
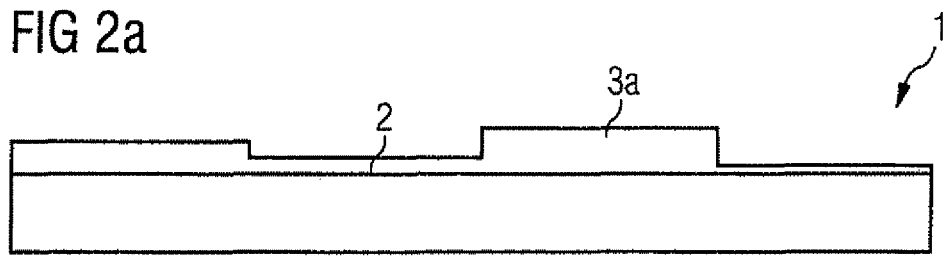
FIGS. 2a-2d schematically different laminating bodies with different imprinted structures as a sectional drawing.

Examples of possible designs of the imprinted structure 3 are represented in cross section in FIGS. 2a to 2d. The imprinted structure 3a can be imprinted on the pressure area 2 over the full area and vary only in its height (FIG. 2a). In so doing, there can be produced not only protruding structures 3a, but also depressions relative to further imprinted structures 3a.

Figure 2B:
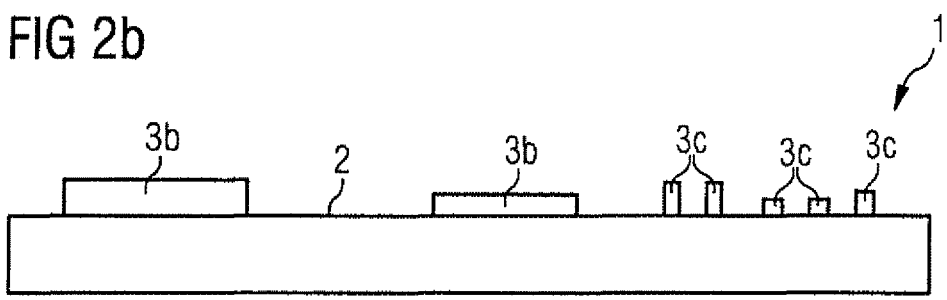

The pressure area 2 represented in FIG. 2b is provided only partly with wide 3b and narrow 3c protruding imprinted structures, while other regions of the pressure area 2 are not provided with imprinted structures 3b, 3c. The imprinted structures 3b, 3c here have different heights.

Figure 2C:
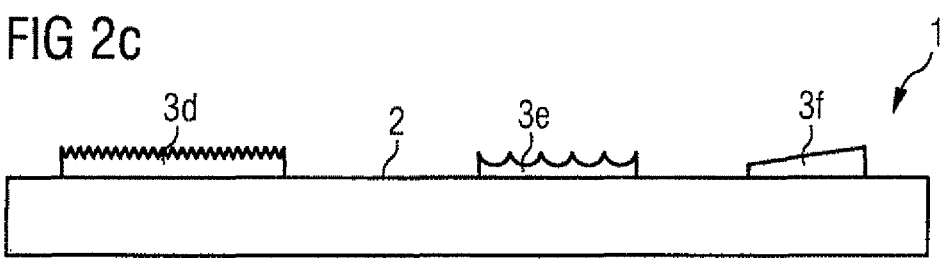

The pressure area 2 represented in FIG. 2c is provided with an imprinted structure 3d with defined roughness, an imprinted structure 3e which upon lamination leaves an MLI (Multiple Laser Image) as an embossing, and a further structure 3f varying in its height. In particular for producing an MLI 3e, but also for producing arbitrary other structures 3f varying in their height, a special relief lacquer can be employed. The structure 3d with defined roughness leaves upon lamination an embossing appearing matt. This structure 3d can have in particular an Rz value of 2-10 μm, whereby the Rz value states the areal roughness by means of the distance between the deepest valley and the highest peak of the rough area.

Figure 2D:
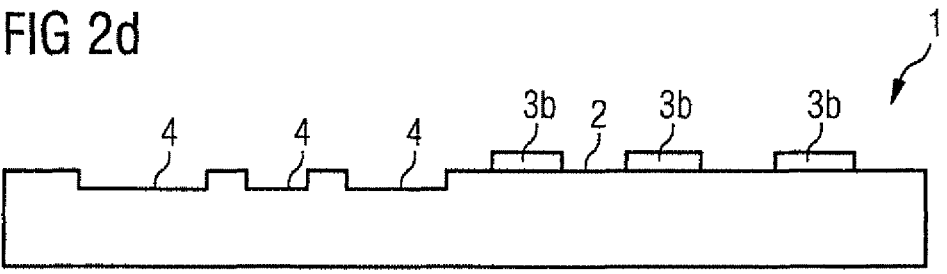

The pressure area 2 represented in FIG. 2d is provided as in FIG. 2b with wide protruding imprinted structures 3b. In contrast to FIG. 2b, however, the pressure area 2 represented here is additionally provided with depressions 4 which have been formed in the laminating body 1 by etching, milling or engraving and thus lie below the level of the pressure area 2.

The imprinted structures, as are represented by way of example in FIGS. 2a to 2d, typically have a height of 2 to 10 μm, but can also have any other height that is technically expedient and desired by a manufacturer of laminate products.

Figure 3:
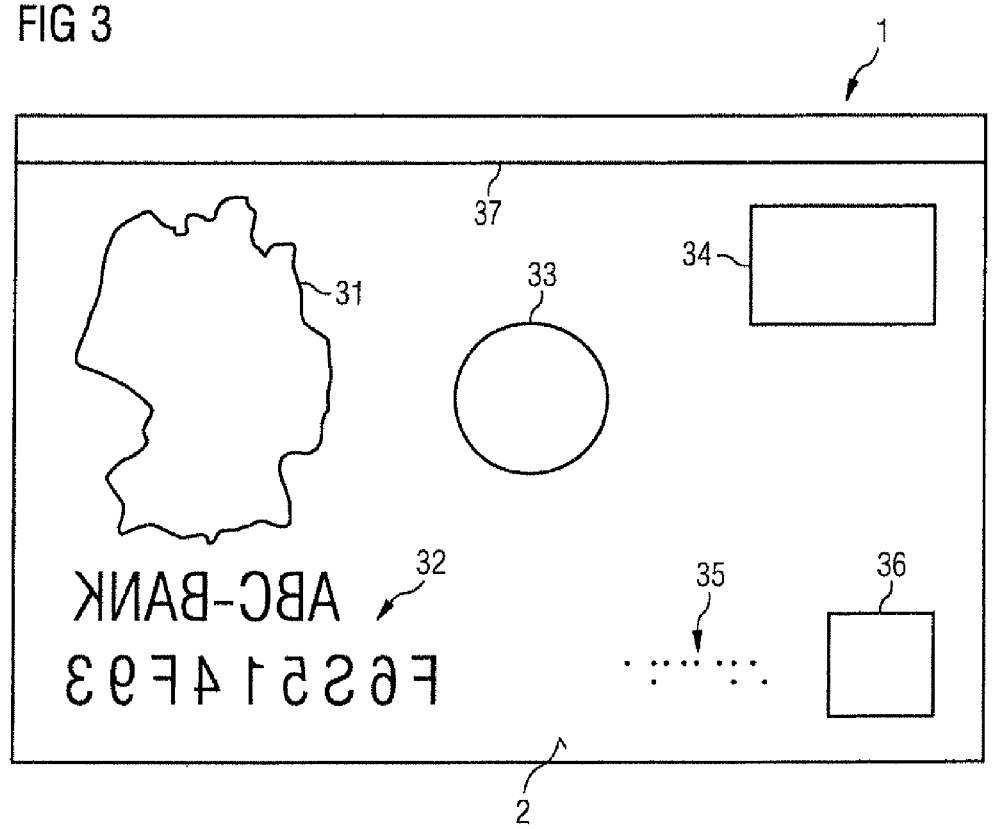
FIG. 3 schematically the pressure area of a laminating body with different imprinted structures in plan view.

In FIG. 3 there is represented a pressure area 2 of a laminating body 1 which is provided with imprinted structures 3 which upon lamination leave embossings in the form of an image of the contour of a country 31, of an image of a guilloche pattern 36, of alphanumeric characters 32, of alphanumeric characters as braille 35, of a height compensation field 33, of an MLI 34 as well as of a marking 37 for technical processing of the laminate product. The alphanumeric characters 32, 35 here represent individualization and personalization data.

Further, there can also be provided images in the form of logos, alphanumeric characters in the form of microcharacters, aids for technical processing of the laminate product in the form of insertion fields and strip fields, or arbitrary other structures which can be produced in a foil 51 by embossing.

The structures 3 can also be provided in the form of areas with defined roughness, as described above in connection with FIG. 2c, in particular for representing the above-mentioned images 31, 36 and markings 37. The areas with defined roughness can be in particular areas that are matt or smooth over the full area or partially. In particular, there can also be provided matt areas with "negative" images, in particular logos, i.e. the images are represented by smooth areas within the matt area.

The imprinted structures 3 can be configured partly or quite generally such that they produce a tactilely perceptible embossing upon lamination.

In the method step S3 of FIG. 1, a foil 51 is finally laminated onto an arbitrary substrate 52 to produce a laminate product 50. In so doing, the structures 3 imprinted on the laminating body are embossed into the foil 51, whereupon the method sequence represented in FIG. 1 finally ends SE.

The laminate product 50 may be, inter alia, a value document, a payment product, an identity and identification document, a chip card or another card-shaped data carrier and value carrier or the like. In particular, the laminate product 50 may also be a national identity card, a laminated page of a passport, a company ID card, a bank card, a credit card, a payment card (cash card), an insurance card, a membership card or the like.

In FIGS. 4a and 4b, possible laminating apparatuses are indicated. In the laminating apparatus of FIG. 4a, the foil 51 is pressed with the pressure areas 2 of two laminating bodies 1 configured as plates onto the substrate 52. The laminating bodies 1 are provided on their pressure areas 2 with imprinted structures 3 which are embossed into the foil 51 during this process. Alternatively, only one of the laminating bodies 1 can of course also be provided on its pressure area 2 with an imprinted structure 3.

In order for the foil 51 to enter into an adhesive connection with the substrate 52, said foil is heated during compressing. Alternatively, self-adhesive foils 51 could also be employed, or an adhesive or adhesion promoter be applied to the foils 51 or the substrate 52. The substrate 52 can consist in particular of paper or plastic, and the foil 51 in particular of plastic.

In the laminating apparatus represented in FIG. 4b, the laminating bodies 1 are configured as rollers with a circumferential pressure area 2. The foils 51 are thus rolled onto the substrate 52. In so doing, they are heated, through which the foils 51 enter into an adhesive connection with the substrate 52, and the laminate product 50 is produced. Simultaneously, the structures 3 imprinted on the pressure areas 2 are embossed into the foil 51. Alternatively, there can also be employed a self-adhesive foil 51 or an adhesion promoter. Likewise, only one of the laminating bodies 1 can also be provided on its pressure area 2 with an imprinted structure 3. The substrate 52 can consist in particular of paper or plastic, and the foil 51 in particular of plastic.

The imprinted structures 3 are shown in FIGS. 4a and 4b for representational reasons as regular, periodically recurring structures 3. In reality, the imprinted structures 3 are normally substantially more complex, as was described for example with reference to FIGS. 2 and 3.

The invention claimed is:

1. A laminating apparatus for manufacturing a laminate product, the laminating apparatus comprising:
   a pressing mechanism configured to apply a laminating force to laminate a foil to a substrate, and
   a laminating body that presses the foil to the substrate, the laminating body including a pressure area configured to contact the foil to press and laminate the foil against the substrate during lamination, wherein
   the laminating body includes a contact surface of the pressure area, the contact surface of the pressure area being configured to contact the foil as the foil is pressed against the substrate during lamination, the pressure area being configured to transmit a laminating pressure from the pressing mechanism to the foil and the substrate,
   only a portion of the contact surface includes an imprinted structure, the imprinted structure including a mirror image of an embossment, the imprinted structure including a thermally stable lacquer provided on the contact surface, and
   the laminating apparatus is configured such that an embossing is formed in the foil by pressing the imprinted structure against a portion of the foil while the pressing mechanism laminates the foil to the substrate by pressing the pressure area against the foil.

2. The laminating apparatus according to claim 1, wherein the laminating body includes a first roller and the pressure area is a first circumferential pressure area at a circumferential surface of the first roller.

3. The laminating apparatus according to claim 2, wherein the laminating body further includes a second roller, the second roller being configured to provide a counter force to the laminating force applied by the pressing mechanism.

4. The laminating apparatus according to claim 3, wherein the second roller having a second circumferential pressure area at a circumferential surface of the second roller,
   the second circumferential pressure area has a second contact surface, the second contact surface of the second circumferential pressure area being configured to contact a second foil provided on an opposite side of the substrate from the first foil such that the laminating apparatus presses the first foil against a first surface of the substrate while pressing the second foil against a second surface of the substrate, the first surface of the substrate being opposite from the second surface of the substrate,
   at least a portion of the second circumferential pressure area includes a second imprinted structure, the second imprinted structure including a second mirror-image of a second embossment, the second imprinted structure being formed of a thermally stable lacquer provided on the second circumferential contact surface, and
   the laminating apparatus is configured such that a second embossing is formed in the second foil by pressing the second imprinted structure against a portion of the second foil while the pressing mechanism laminates the first foil and the second foil to the substrate.

5. The laminating apparatus according to claim 1, wherein the laminating body includes a first plate and the pressure area is a surface pressure area of the first plate.

6. The laminating apparatus according to claim 5, wherein the laminating body further includes a second plate, the second plate being configured to provide a counter force to the laminating force applied by the pressing mechanism.

7. The laminating apparatus according to claim 6, wherein
the second plate having a second surface pressure area,
the second surface pressure area has a second contact surface, the second contact surface of the second surface pressure area being configured to contact a second foil provided on an opposite side of the substrate from the first foil such that the laminating apparatus presses the first foil against a first surface of the substrate while pressing the second foil against a second surface of the substrate, the first surface of the substrate being opposite from the second surface of the substrate,
at least a portion of the second surface pressure area includes a second imprinted structure, the second imprinted structure including a second mirror-image of a second embossment, the second imprinted structure being formed of a thermally stable lacquer provided on the second surface pressure area, and
the laminating apparatus is configured such that a second embossing is formed in the second foil by pressing the second imprinted structure against a portion of the second foil while the pressing mechanism laminates the first foil and the second foil to the substrate.

8. The laminating apparatus according to claim 1, further comprising a heating unit configured to heat the foil for lamination to the substrate.

9. The laminating apparatus according to claim 1, wherein the mirror image of the embossment includes a mirror image of a multiple laser image, a country contour, a guilloche pattern, alphanumeric characters, or a machine-readable marking of the laminate product formed upon lamination.

10. The laminating apparatus according to claim 1, wherein the laminating body includes a high-gloss laminating plate formed of steel, chromium steel, brass, nickel-plating, or chromium plating.

11. The laminating apparatus according to claim 1, wherein the thermally stable lacquer is a stoving lacquer or a UV-cured lacquer.

12. The laminating apparatus according to claim 1, wherein the thermally stable lacquer is removable with a cleaner.

13. The laminating apparatus according to claim 1, wherein the pressure area further comprises additional structure that includes depressions that extend within the laminating body beyond a surface level of the pressure area.

14. The laminating apparatus according to claim 1, wherein the laminating body comprises a laminating plate.

15. The laminating apparatus according to claim 1, wherein the mirror image of the embossment includes a mirror image representation of personalization data of a user of the laminate product.

16. The laminating apparatus according to claim 1, wherein the imprinted structure is a screen printing printed on the pressure area of the imprinted structure or the imprinted structure is an offset printing printed on the pressure area.

17. The laminating apparatus according to claim 1, wherein an adhesion promoter is applied to the laminating body, the adhesion promoter facilitating adhesion of the thermally stable lacquer to the to the portion of the contact surface of the pressure area.

18. The laminating apparatus according to claim 1, wherein laminating apparatus is configured to manufacture a value document, a payment product, an identification document, a chip card or another card-shaped data carrier, a value carrier, a national identity card, a laminated page of a passport, a company ID card, a bank card, a credit card, a payment card, an insurance card, or a membership card.

19. The laminating apparatus according to claim 1, further comprising an adhesive applicator configured to apply an adhesive or an adhesion promoter to the foil or to the substrate during lamination of the foil to the substrate.

20. The laminating apparatus according to claim 1, further comprising a foil supplier and a substrate supplier, wherein the foil supplier includes a plastic foil or the substrate supplier includes a plastic substrate or a paper substrate.

* * * * *